US00RE44425E

(19) United States
(12) Reissued Patent
Johnson

(10) Patent Number: US RE44,425 E
(45) Date of Reissued Patent: *Aug. 13, 2013

(54) CONTINUOUS CASTING OF BULK SOLIDIFYING AMORPHOUS ALLOYS

(75) Inventor: William L. Johnson, Pasadena, CA (US)

(73) Assignee: Crucible Intellectual Property, LLC, Rancho Santa Margarita, CA (US)

( * ) Notice: This patent is subject to a terminal disclaimer.

(21) Appl. No.: 13/212,410

(22) Filed: Aug. 18, 2011

Related U.S. Patent Documents

Reissue of:
(64) Patent No.: 7,575,040
Issued: Aug. 18, 2009
Appl. No.: 10/552,667
PCT Filed: Apr. 14, 2004
PCT No.: PCT/US2004/011559
§ 371 (c)(1),
(2), (4) Date: Jun. 21, 2006
PCT Pub. No.: WO2004/092428
PCT Pub. Date: Oct. 28, 2004

(51) Int. Cl.
*B22D 11/06* (2006.01)

(52) U.S. Cl.
USPC ..... 164/463; 164/423

(58) Field of Classification Search
USPC ..... 164/463, 423, 479–482
See application file for complete search history.

(56) References Cited

U.S. PATENT DOCUMENTS 2,190,611 A * 2/1940 Sembdner ..... 29/33 R
3,989,517 A * 11/1976 Tanner et al. ..... 148/403
4,050,931 A * 9/1977 Tanner et al. ..... 148/403
4,064,757 A * 12/1977 Hasegawa ..... 374/185
4,067,732 A * 1/1978 Ray ..... 148/403
4,099,961 A * 7/1978 Patten ..... 75/415
4,113,478 A * 9/1978 Tanner et al. ..... 148/403
4,116,682 A * 9/1978 Polk et al. ..... 148/403
4,116,687 A * 9/1978 Hasegawa ..... 148/403
4,126,449 A * 11/1978 Tanner et al. ..... 148/403
4,135,924 A * 1/1979 Tanner et al. ..... 148/403
4,148,669 A * 4/1979 Tanner et al. ..... 148/538
4,157,327 A * 6/1979 Martin et al. ..... 523/307
4,289,009 A * 9/1981 Festag et al. ..... 72/60
4,472,955 A * 9/1984 Nakamura et al. ..... 72/57
4,478,918 A * 10/1984 Ueno et al. ..... 429/435
4,621,031 A * 11/1986 Scruggs ..... 428/627
4,623,387 A * 11/1986 Masumoto et al. ..... 420/41
4,648,437 A * 3/1987 Pryor et al. ..... 164/463
4,648,609 A * 3/1987 Deike ..... 279/19.1
4,710,235 A * 12/1987 Scruggs ..... 419/7
4,721,154 A * 1/1988 Christ et al. ..... 164/452

(Continued)

FOREIGN PATENT DOCUMENTS

GB 2236325 A * 4/1991
JP 59013056 A * 1/1984

(Continued)

OTHER PUBLICATIONS

Brochure entitled ProCAST . . . not just for castings!, UES, Inc., 1 page.*

(Continued)

*Primary Examiner* — Keith Walker
*Assistant Examiner* — Kevin E Yoon
(74) *Attorney, Agent, or Firm* — Pillsbury Winthrop Shaw Pittman LLP

(57) ABSTRACT

A process and apparatus for continuous casting of amorphous alloy sheets having large sheet thickness using bulk solidifying amorphous alloys are provided. Thick continuous amorphous alloy sheets made of bulk solidifying amorphous alloys are also provided.

35 Claims, 6 Drawing Sheets

(56) References Cited

U.S. PATENT DOCUMENTS

| | | | | | |
|---|---|---|---|---|---|
| 4,743,513 | A | * | 5/1988 | Scruggs | 428/668 |
| 4,768,458 | A | * | 9/1988 | Arakawa et al. | 164/463 |
| 4,791,979 | A | * | 12/1988 | Liebermann | 164/463 |
| 4,854,370 | A | * | 8/1989 | Nakamura | 164/259 |
| 4,976,417 | A | * | 12/1990 | Smith | 267/25 |
| 4,978,590 | A | * | 12/1990 | Granata et al. | 429/510 |
| 4,987,033 | A | * | 1/1991 | Abkowitz et al. | 428/469 |
| 4,990,198 | A | * | 2/1991 | Masumoto et al. | 148/403 |
| 5,032,196 | A | * | 7/1991 | Masumoto et al. | 148/403 |
| 5,053,084 | A | * | 10/1991 | Masumoto et al. | 148/561 |
| 5,053,085 | A | * | 10/1991 | Masumoto et al. | 148/403 |
| 5,074,935 | A | * | 12/1991 | Masumoto et al. | 148/403 |
| 5,117,894 | A | * | 6/1992 | Katahira | 164/113 |
| 5,131,279 | A | * | 7/1992 | Lang et al. | 73/861.27 |
| 5,169,282 | A | * | 12/1992 | Ueda et al. | 414/800 |
| 5,213,148 | A | * | 5/1993 | Masumoto et al. | 164/122 |
| 5,225,004 | A | * | 7/1993 | O'Handley et al. | 148/101 |
| 5,250,124 | A | * | 10/1993 | Yamaguchi et al. | 148/403 |
| 5,279,349 | A | * | 1/1994 | Horimura | 164/120 |
| 5,288,344 | A | * | 2/1994 | Peker et al. | 148/403 |
| 5,296,059 | A | * | 3/1994 | Masumoto et al. | 148/695 |
| 5,302,471 | A | * | 4/1994 | Ito et al. | 429/442 |
| 5,306,463 | A | * | 4/1994 | Horimura | 419/44 |
| 5,312,495 | A | * | 5/1994 | Masumoto et al. | 148/550 |
| 5,324,368 | A | * | 6/1994 | Masumoto et al. | 148/561 |
| 5,368,659 | A | * | 11/1994 | Peker et al. | 148/403 |
| 5,380,375 | A | * | 1/1995 | Hashimoto et al. | 148/403 |
| 5,384,203 | A | * | 1/1995 | Apfel | 428/613 |
| 5,390,724 | A | * | 2/1995 | Yamauchi et al. | 164/147.1 |
| 5,449,425 | A | * | 9/1995 | Renard et al. | 156/78 |
| 5,482,580 | A | * | 1/1996 | Scruggs et al. | 148/528 |
| 5,567,251 | A | * | 10/1996 | Peker et al. | 148/522 |
| 5,589,012 | A | * | 12/1996 | Hobby et al. | 148/561 |
| 5,618,359 | A | * | 4/1997 | Lin et al. | 148/561 |
| 5,634,989 | A | * | 6/1997 | Hashimoto et al. | 148/403 |
| 5,647,921 | A | * | 7/1997 | Odagawa et al. | 148/561 |
| 5,711,363 | A | * | 1/1998 | Scruggs et al. | 164/113 |
| 5,735,975 | A | * | 4/1998 | Lin et al. | 148/403 |
| 5,797,443 | A | * | 8/1998 | Lin et al. | 164/4.1 |
| 5,886,254 | A | * | 3/1999 | Chi | 73/146.8 |
| 5,950,704 | A | * | 9/1999 | Johnson et al. | 164/47 |
| 6,021,840 | A | * | 2/2000 | Colvin | 164/113 |
| 6,027,586 | A | * | 2/2000 | Masumoto et al. | 148/561 |
| 6,044,893 | A | * | 4/2000 | Taniguchi et al. | 164/70.1 |
| 6,200,685 | B1 | * | 3/2001 | Davidson | 428/472.1 |
| 6,203,936 | B1 | * | 3/2001 | Cisar et al. | 429/518 |
| 6,258,183 | B1 | * | 7/2001 | Onuki et al. | 148/403 |
| 6,306,228 | B1 | * | 10/2001 | Inoue et al. | 148/538 |
| 6,325,868 | B1 | * | 12/2001 | Kim et al. | 148/403 |
| 6,371,195 | B1 | * | 4/2002 | Onuki et al. | 164/113 |
| 6,376,091 | B1 | * | 4/2002 | Croopnick | 428/472 |
| 6,408,734 | B1 | * | 6/2002 | Cohen | 89/36.02 |
| 6,446,558 | B1 | * | 9/2002 | Peker et al. | 102/306 |
| 6,491,592 | B2 | * | 12/2002 | Cackett et al. | 473/342 |
| 6,771,490 | B2 | * | 8/2004 | Peker et al. | 361/679.34 |
| 6,843,496 | B2 | * | 1/2005 | Peker et al. | 280/610 |
| 6,887,586 | B2 | * | 5/2005 | Peker et al. | 428/600 |
| 7,588,071 | B2 | * | 9/2009 | Kang | 164/463 |
| 2001/0052406 | A1 | * | 12/2001 | Kubota et al. | 164/138 |
| 2002/0036034 | A1 | * | 3/2002 | Xing et al. | 148/561 |
| 2002/0050310 | A1 | * | 5/2002 | Kundig et al. | 148/561 |
| 2002/0187379 | A1 | * | 12/2002 | Yasuo et al. | 429/34 |
| 2003/0024616 | A1 | * | 2/2003 | Kim et al. | 148/561 |
| 2003/0222122 | A1 | * | 12/2003 | Johnson et al. | 228/101 |

FOREIGN PATENT DOCUMENTS

| | | | | |
|---|---|---|---|---|
| JP | 359013056 | A | | 1/1984 |
| JP | 61238423 | A | * | 10/1986 |
| JP | 06-264200 | | | 9/1994 |
| JP | 06264200 | A | * | 9/1994 |
| JP | 2000-256811 | | | 9/2000 |
| JP | 2000256811 | A | * | 9/2000 |
| JP | 2000277127 | A | * | 10/2000 |
| JP | 2001303218 | | | 10/2001 |
| JP | 2001303218 | A | * | 10/2001 |

OTHER PUBLICATIONS

Zhang et al., "Amorphous Zr-Al-TM (TM=Co, Ni, Cu) Alloys with Significant Supercooled Liquid Region of Over 100 K", Materials Transactions, JIM, 1991, vol. 32, No. 11, pp. 1005-1010.*

Kato et al., "Production of Bulk Amorphous $Mg_{85}Y_{10}Cu_5$ Alloy by Extrusion of Atomized Amorphous Powder", Materials Transactions, JIM, 1994, vol. 35, No. 2, pp. 125-129.*

Kawamura et al., Full Strength Compacts by Extrusion of Glassy Metal Powder at the Supercooled Liquid State, Appl. Phys. Lett. 1995, vol. 67, No. 14, pp. 2008-2010.*

Catalog Cover Entitled, Interbike Buyer Official Show Guide, 1995, 3 pages.*

Polk et al., "The Effect of Oxygen Additions on the Properties of Amorphous Transition Metal Alloys", Source and date unknown, pp. 220-230.*

Lyman et al., Metals Handbook, Forging and Casting, 8th ed., 1970, vol. 5, pp. 285-291 and 300-306.*

Eshbach et al., "Section 12—Heat Transfer", Handbook of Engineering Fundamentals, 3d ed., 1975, pp. 1113-1119.*

Inoue, et al., "Mg-Cu-Y Bulk Amorphous Alloys with High Tensile Strength Produced by a High-Pressure Die Casting Method", Materials Transactions, 1992, JIM, vol. 33, No. 10, pp. 937-945.*

Tanner, L.E., "The Stable and Metastable Phase Relations in the Hf-Be Alloy System", Metallurgica, vol. 28, 1980, pp. 1805-1815.*

Maret et al., "Structural Study of $Be_{43}Hf_xZr_{57-x}$ Metallic Glasses by X-Ray and Neutron Diffraction", J. Physique, 1986, vol. 47, pp. 863-871.*

Jost et al., "The Structure of Amorphous Be-Ti-Zr Alloys", Zeitschrift fur Physikalische Chemie Neue Folge, Bd. 157, 1988, pp. 11-15.*

Tanner et al., "Metallic Glass Formation and Properties in Zr and Ti Alloyed with Be-I the Binary Zr-Be and Ti-Be Systems", Acta Metallurgica, 1979, vol. 27, pp. 1727-1747.*

Inoue et al., "Zr-Al-Ni Amorphous Alloys with High Glass Transition Temperature and Significant Supercooled Liquid Region", Materials Transactions, JIM, 1990, vol. 31, No. 3, pp. 177-183.*

Tanner, L.E., "Physical Properties of Ti-Be-Si Glass Ribbons", Scripta Metallurgica, 1978, vol. 12, pp. 703-708.*

Hasegawa et al., "Superconducting Properties of Be-Zr Glassy Alloys Obtained by Liquid Quenching", May 9, 1977, pp. 3925-3928.*

Tanner et al., "Physical Properties of $Ti_{50}Be_{40}Zr_{10}$ Glass", Scripta Metallurgica, 1977, vol. 11, pp. 783-789.

Inoue, et al., "Bulky La-Al-TM (TM=Transition Metal) Amorphous Alloys with High Tensile Strength Produced by a High-Pressure Die Casting Method", Materials Transactions, 1993, JIM, vol. 34, No. 4, pp. 351-358.

* cited by examiner

CONTINUOUS CASTING OF BULK SOLIDIFYING AMORPHOUS ALLOYS

Matter enclosed in heavy brackets [ ] appears in the original patent but forms no part of this reissue specification; matter printed in italics indicates the additions made by reissue.

FIELD OF THE INVENTION

This invention relates to continuous sheet casting of bulk-solidifying amorphous alloys, and, more particularly, to a method of continuous sheet casting amorphous alloy sheets having a large thickness.

BACKGROUND OF THE INVENTION

Amorphous alloys have non-crystalline (amorphous) atomic structures generally formed by fast cooling the alloy from the molten liquid state to a solid state without the nucleation and growth of crystalline phases. As a result of the unique atomic structure produced during this process, amorphous alloys have high mechanical strength and good elasticity, while also exhibiting good corrosion resistance. Therefore, there is strong motivation in the materials field to find new applications for these materials in a variety of industries. However, because amorphous alloys require rapid cooling rates as they are solidified from temperatures above the melting state, it typically has only been possible to produce very thin ribbons or sheets of the alloys on a commercial scale, usually by a melt spin process wherein a stream of molten metal is rapidly quenched.

FIGS. 1a and 1b show partial cross sectional schematic side views of a conventional continuous sheet casting apparatus. In a conventional continuous sheet casting process and apparatus 1, as shown in FIG. 1a, there is an orifice 3 through which molten alloy from a reservoir 5 is injected onto a chilled rotating wheel 7 to form a solidified sheet 9. To provide a steady state flow of melt through the orifice, there are some complex relations that need to be satisfied between the applied pressure (or gravitational pull-down), the orifice slit size, the surface tension of the melt, the viscosity of the melt, and the pull-out speed of the solidification front. In the apparatus shown in FIG. 1a, the pull-out speed of the solidification front is primarily determined by the speed 11 of rotating wheel 7.

As shown, in the detailed view in FIG. 1b, the chill body wheel 7 travels in a clockwise direction in close proximity to a slotted nozzle 3 defined by a left side lip 13 and a right side lip 15. As the metal flows onto the chill body 7 it solidifies forming a solidification front 17. Above the solidification front 17 a body of molten metal 19 is maintained. The left side lip 13 supports the molten metal essentially by a pumping action which results from the constant removal of the solidified sheet 9. The rate of flow of the molten metal is primarily controlled by the viscous flow between the right side lip 15 and solidified sheet 9. In order to obtain a sufficiently high quench-rate to ensure that the formed sheet is amorphous, the surface of the chill body 7 must move at a velocity of at least about 200 meters per minute. This speed of rotation in turn limits the thickness of the sheets formed by the conventional process to less than about 0.02 millimeter.

Although it is possible to obtain quench rates at lower velocities, there are many difficulties that are encountered. For example, at typical melt viscosities and low wheel rotational speeds it is not possible to reliably sustain a continuous process. As a result, the melt may flow too fast through the orifice slit and spill over the wheel, precluding a stable melt puddle and a steady state moving solidification front. Although, some remedies can be implemented, such as reducing the orifice slit size, generally this is not a practical solution because the molten metal would erode the opening of such a small orifice very quickly. Despite these problems, an amorphous metal sheet having a sheet thickness ranging from 50 to 75 μm, and also retaining the mechanical properties of the amorphous alloys is disclosed in U.S. Pat. No. 6,103,396; however, the thickness range available for the disclosed process still leads to limitations in the types of applications in which such materials may be used.

Accordingly a need exists for a continuous process to cast thick sheets of bulk solidifying amorphous alloys.

SUMMARY OF THE INVENTION

The present invention is directed to a process and apparatus for continuous casting of amorphous alloy sheets having large sheet thickness using bulk solidifying amorphous alloys.

In one embodiment of the invention, the sheet is formed using conventional single roll, double roll, or other chill-body forms.

In another embodiment of the invention, the amorphous alloy sheets have sheet thicknesses of from 0.1 mm to 10 mm.

In one embodiment of the invention, the casting temperature is stabilized in a viscosity regime of 0.1 to 10,000 poise, preferably 1 to 1,000 poise, and more preferably 10 to 100 poise.

In one embodiment of the invention, the extraction of continuous sheet is preferably done at speeds of 0.1 to 50 cm/sec, and preferably 0.5 to 10 cm/sec, and more preferably of 1 to 5 cm/sec.

BRIEF DESCRIPTION OF THE DRAWINGS

These and other features and advantages of the present invention will be better understood by reference to the following detailed description when considered in conjunction with the accompanying drawings wherein:

FIG. 1b is a close-up of the formation of the sheet of molten metal shown in FIG. 1a.

DETAILED DESCRIPTION OF THE INVENTION

Figure 1A:
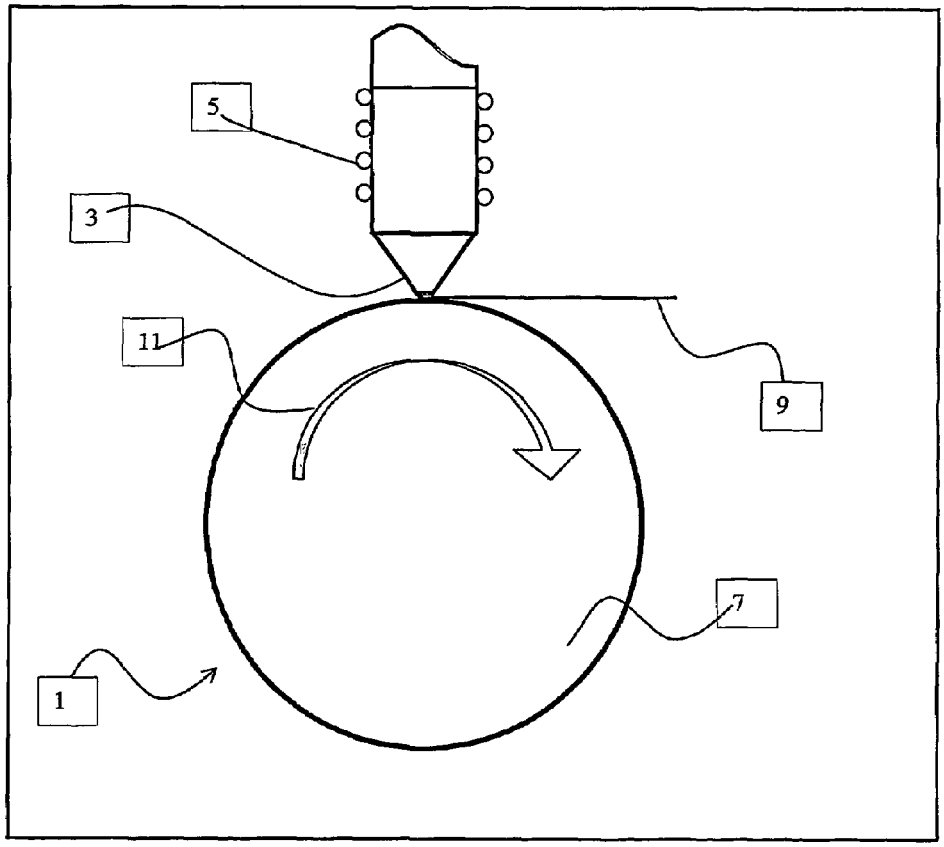
FIG. 1a is a side view in partial cross section of an exemplary conventional prior art apparatus for forming sheets of a molten metal.

The present invention is directed to a continuous casting process and apparatus for forming an amorphous alloy sheet having a large sheet thickness using a bulk solidifying amorphous alloy. The invention recognizes that it is possible to form a sheet of large thickness using bulk-solidifying amorphous alloys at high viscosity regimes.

For the purposes of this invention, the term amorphous means at least 50% by volume of the alloy is in amorphous atomic structure, and preferably at least 90% by volume of the alloy is in amorphous atomic structure, and most preferably at least 99% by volume of the alloy is in amorphous atomic structure.

Bulk solidifying amorphous alloys are a recently discovered family of amorphous alloys, which can be cooled at substantially lower cooling rates, of about 500 K/sec or less, and substantially retain their amorphous atomic structure. As such, they can be produced in thicknesses of 1.0 mm or more, substantially thicker than conventional amorphous alloys, which are typically limited to thicknesses of 0.020 mm, and which require cooling rates of $10^5$ K/sec or more. U.S. Pat. Nos. 5,288,344; 5,368,659; 5,618,359; and 5,735,975, the disclosures of which are incorporated herein by reference in their entirety, disclose such bulk solidifying amorphous alloys.

One exemplary family of bulk solidifying amorphous alloys can be described as $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages. Furthermore, these basic alloys can accommodate substantial amounts (up to 20% atomic, and more) of other transition metals, such as Hf, Ta, Mo, Nb, Cr, V, Co. A preferable alloy family is $(Zr,Ti)_a(Ni,Cu)_b(Be)_c$, where a is in the range of from 40 to 75, b is in the range of from 5 to 50, and c in the range of from 5 to 50 in atomic percentages. Still, a more preferable composition is $(Zr,Ti)_a(Ni,Cu)_b(Be)_c$, where a is in the range of from 45 to 65, b is in the range of from 7.5 to 35, and c in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d in the range of from 7.5 to 15 in atomic percentages.

Another set of bulk-solidifying amorphous alloys are ferrous metals (Fe, Ni, Co) based compositions, where the ferrous metal content is more than 50% by weight. Examples of such compositions are disclosed in U.S. Pat. No. 6,325,868 and in publications to (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. # 2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not processable to the degree of the Zr-base alloy systems, they can still be processed in thicknesses of 1.0 mm or more, sufficient enough to be utilized in the current invention.

In general, crystalline precipitates in bulk amorphous alloys are highly detrimental to the properties of amorphous alloys, especially to the toughness and strength of these alloys, and as such it is generally preferred to minimize the volume fraction of these precipitates. However, there are cases in which, ductile crystalline phases precipitate in-situ during the processing of bulk amorphous alloys, which are indeed beneficial to the properties of bulk amorphous alloys, especially to the toughness and ductility of the alloys. Such bulk amorphous alloys comprising such beneficial precipitates are also included in the current invention. One exemplary case is disclosed in (C. C. Hays et. al, Physical Review Letters, Vol. 84, p 2901, 2000), the disclosure of which is incorporated herein by reference.

Figure 1B:
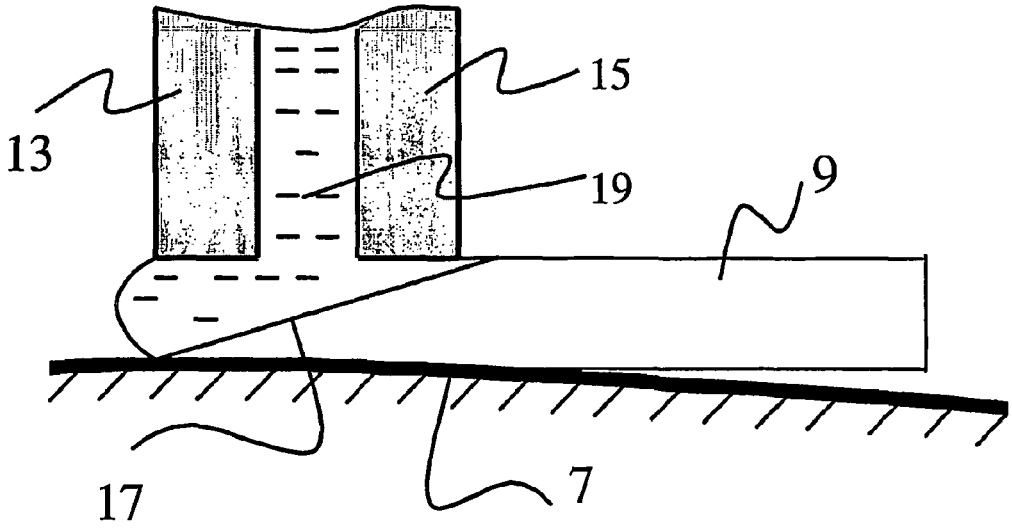

As discussed above, in one embodiment the present invention is directed to an apparatus for forming amorphous alloy sheets having large thicknesses of from 0.1 mm to 10 mm and having good ductility. In such an embodiment the sheet may be formed using a conventional single roll, double roll or other chill-body forms. Schematic diagrams of such conventional single roll apparatus are provided in FIGS. 1a and 1b.

As shown in these diagrams, the continuous casting apparatus has a chill body 7 which moves relative to a injection orifice 3, through which the melt 19 is introduced. In this specification, the apparatus is described with reference to the section of a casting wheel 7 which is located at the wheel's periphery and serves as a quench substrate as used in the prior art. It will be appreciated that the principles of the invention are also applicable, as well, to other conventional quench substrate configurations such as a belt, double-roll wheels, wheels having shape and structure different from those of a wheel, or to casting wheel configurations in which the section that serves as a quench substrate is located on the face of the wheel or another portion of the wheel other than the wheel's periphery. In addition, it should be understood that the invention is also directed to apparatuses that quench the molten alloy by other mechanisms, such as by providing a flow of coolant fluid through axial conduits lying near the quench substrate.

Figure 2:
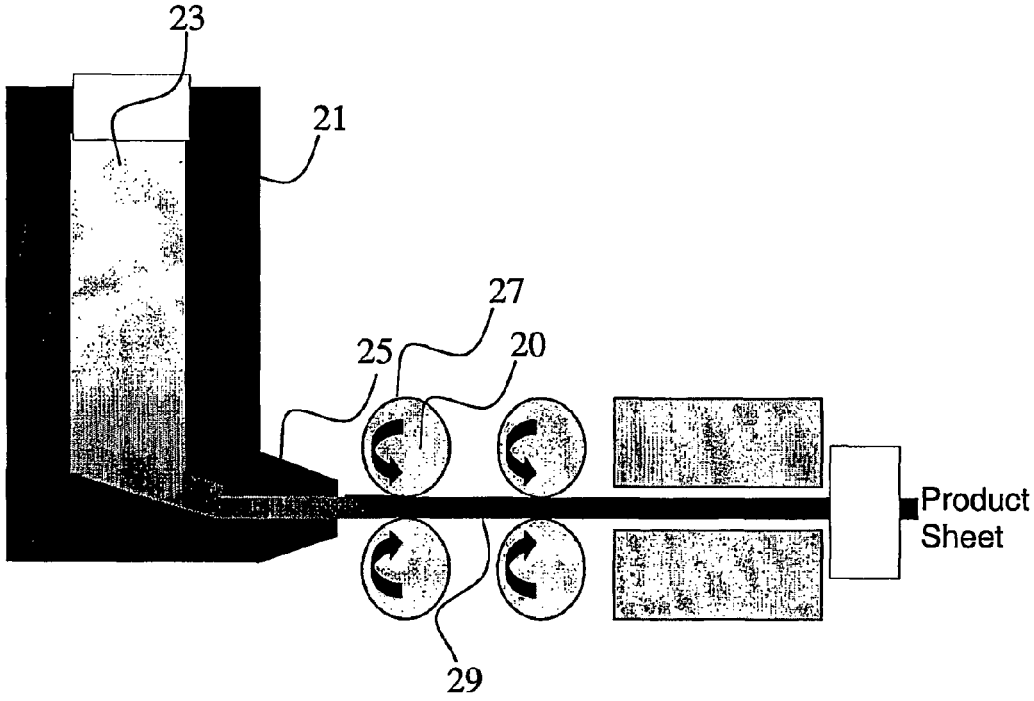
FIG. 2 is a side view in partial cross section of an exemplary apparatus for forming sheets of a bulk solidifying amorphous alloy in accordance with the current invention.

In FIG. 2, there is shown generally an apparatus for continuous casting of metallic sheet in accordance with an exemplary embodiment of the current invention. The apparatus has an annular casting wheel 20 rotatably mounted on its longitudinal axis, a reservoir 21 for holding molten metal 23. The reservoir 21 is in communication with a slotted nozzle 25, which is mounted in proximity to the substrate 27 of the annular casting wheel 20. The reservoir 21 is further equipped with means for pressurizing the molten metal contained therein to effect expulsion thereof through the nozzle 25. In operation, molten metal maintained under pressure in the reservoir 21 is ejected through nozzle 25 onto the rapidly moving casting wheel substrate 27, whereon it solidifies to form a continuous sheet 29. After solidification, the sheet 29 separates from the casting wheel 20 and is flung away therefrom to be collected by a winder or other suitable collection device (not shown).

The casting wheel quench substrate 27 may be comprised of copper or any other metal or alloy having relatively high thermal conductivity. Preferred materials of construction for the substrate 27 include fine, uniform grain-sized precipitation hardening copper alloys such as chromium copper or beryllium copper, dispersion hardening alloys, and oxygen-free copper. If desired, the substrate 27 may be highly polished or chrome-plated, or the like to obtain a sheet having smooth surface characteristics.

To provide additional protection against erosion, corrosion or thermal fatigue, the surface of the casting wheel may be coated in a conventional way using a suitably resistant or high-melt coating. For example, a ceramic coating or a coating of a corrosion-resistant, high-melting temperature metal may be applied provided that the wettability of the molten metal or alloy being cast on the chill surface is adequate.

Figure 3:
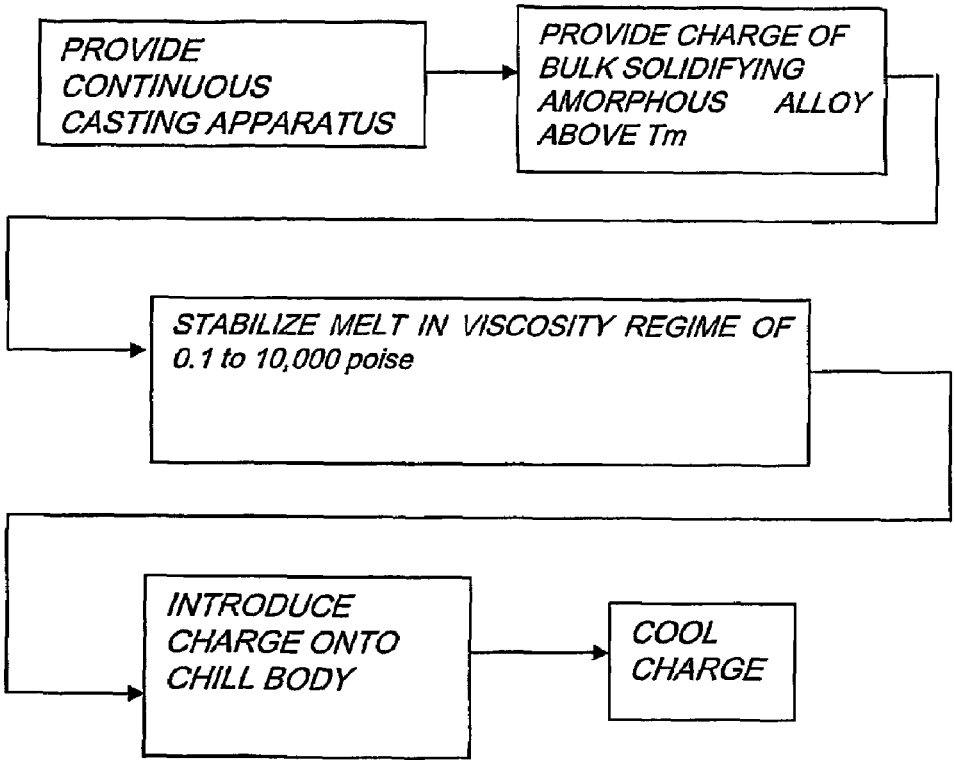
FIG. 3 is block flow diagram of an exemplary method for continuous casting bulk solidifying amorphous alloys in accordance with the current invention.

The present invention is also directed to a processing method for making continuous amorphous alloy sheets with large thickness from bulk-solidifying amorphous alloys. A flow chart of this general process is shown in FIG. 3, and the process comprises the following general steps:

1) Providing a continuous casting apparatus;
2) Providing a charge of bulk solidifying amorphous alloy above its melting temperature;
3) Stabilizing the charge at a casting temperature in a viscosity regime of about 0.1 to 10,000 poise;
4) Introducing the melt onto the chill body of the continuous casting apparatus; and 5) Quenching the viscous melt into an amorphous solid sheet.

As described above, in a first processing step a charge of the bulk solidifying amorphous alloy is provided. Viscosity and temperature processing parameters for an exemplary bulk solidifying amorphous alloy are provided in FIGS. 4 and 5. Such alloys can be cooled from the above the casting temperatures at relatively low cooling rates, on the order of about 1000° C. per second or less, yet retain a substantially amorphous structure after cooling.

Figure 5:
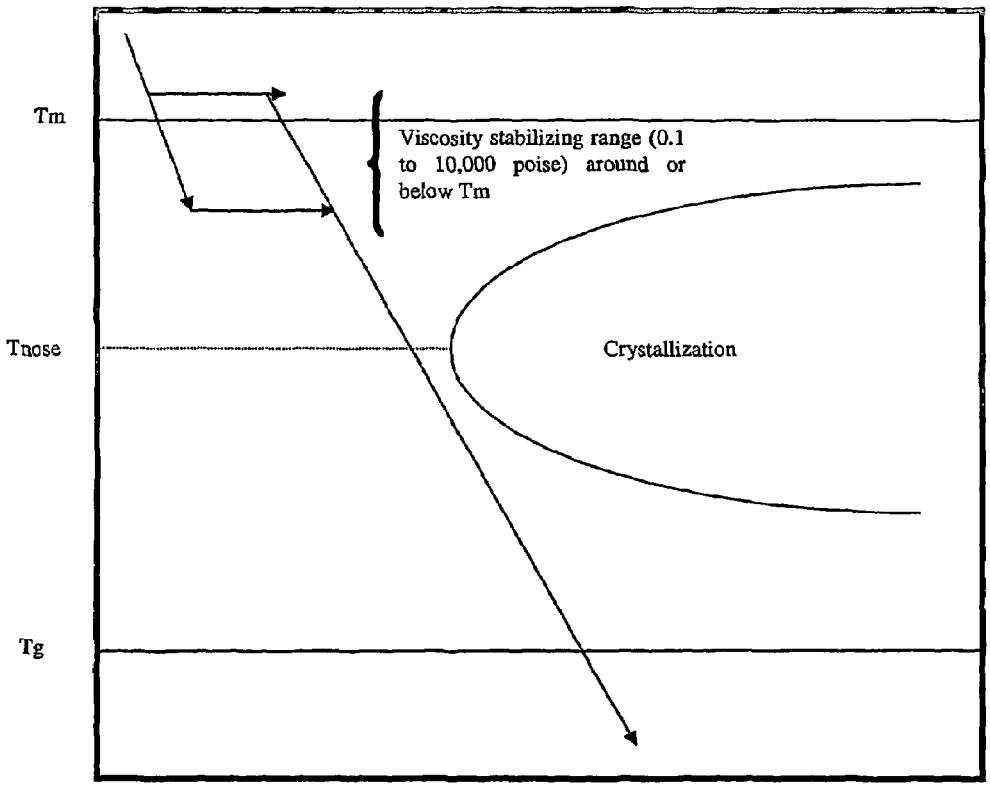
FIG. 5 is a time-temperature transformation diagram for an exemplary continuous casting sequence in accordance with the current invention.

FIG. 5 shows the time-temperature cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures becomes more viscous as the temperature is reduced, eventually taking on the outward physical properties of a conventional solid. This ability to retain an amorphous structure even at a relatively slow cooling rate is to be contrasted with the behavior of other types of amorphous metals that require cooling rates of at least about $10^4$~$10^{6}$° C. per second to retain their amorphous structure upon cooling. As discussed previously, because of these high cooling rates such metals can only be fabricated in the amorphous form as very thin sheets of about 0.020 mm. As a result, such a metal has limited usefulness because it cannot be prepared in the thicker sections require for most applications.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature lay in the range of about 0.1 poise to about 10,000 poise, which is to be contrasted with the behavior of other types of amorphous metals that have the viscosities at the melting temperature under 0.01 poise. In addition, higher values of viscosity can be obtained for bulk solidifying amorphous alloys by undercooling the alloy below the melting temperature, whereas ordinary amorphous alloys will tend to crystallize rather rapidly when undercooled.

Figure 4:
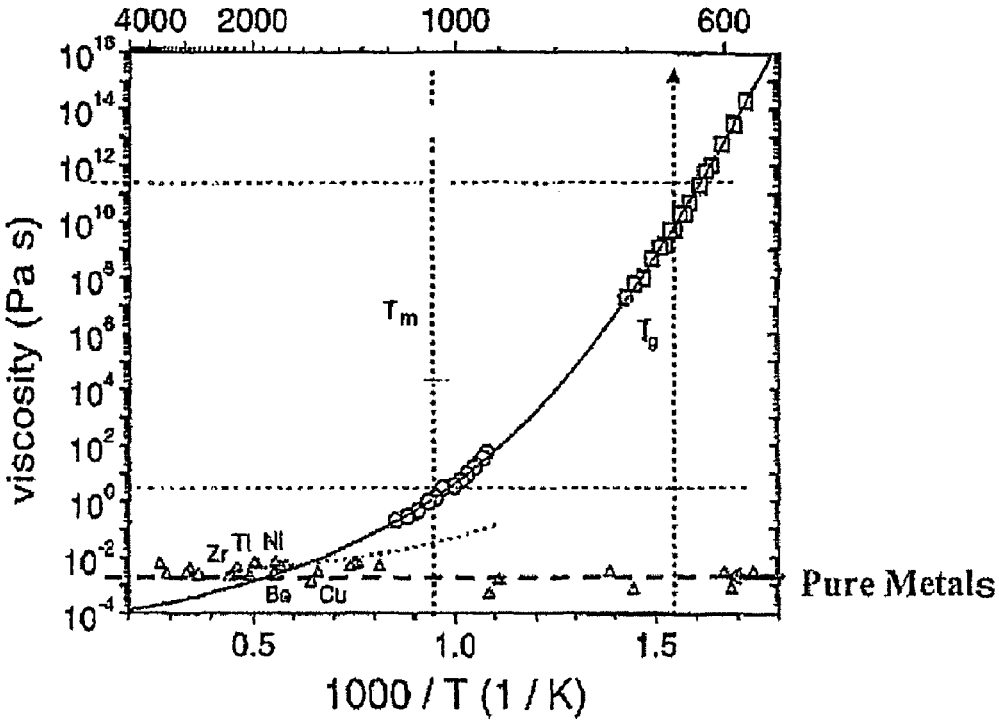
FIG. 4 is a temperature-viscosity of an exemplary bulk solidifying amorphous alloy in accordance with the current invention.

FIG. 4 shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

In accordance with FIG. 3, in the next steps of the process the charge is first heated above Tm, and then stabilized at the casting temperature in the reservoir such that the viscosity of the melt is around about 0.1 to 10,000 poise. The charge is then ejected from the reservoir through the nozzle onto the moving surface of the chill body. Throughout these steps the viscosity of the alloy is about 0.1 to about 10,000 poise, as shown in FIG. 4. Since the viscosity of the alloy increases with decreasing temperature, the step of ejecting the molten amorphous alloy is preferably carried out below the Tm to ensure increased viscosity and thickness. For larger thicknesses of amorphous alloy sheet a higher viscosity is preferred, and accordingly, greater undercooling below Tm is employed. However, it should be noted that the viscosity stabilization should be done at temperatures above Tnose as shown in the TTT diagram of FIG. 5.

Using the TTT and viscosity-temperature measurements shown in FIGS. 5 and 4, respectively for the alloys to be cast, the ejection temperature can be chosen to provide a specified thickness of cast sheet. Regardless of the cast temperature, the extraction of a continuous sheet is preferably done at speeds of 0.1 to 50 cm/sec, and preferably 0.5 to 10 cm/sec, and more preferably of 1 to 5 cm/sec.

After the alloy is ejected onto the chill body, the charge of amorphous alloy on the surface of chill body is cooled to temperatures below the glass transition temperature at a rate such that the amorphous alloy retains the amorphous state upon cooling. Preferably, the cooling rate is less than 1000° C. per second, *even more preferably, the cooling rate can be less than 10° C. per second,* but is sufficiently high to retain the amorphous state in the bulk solidifying amorphous alloy upon cooling. Once the lowest cooling rate that will achieve the desired amorphous structure in the article is chosen it can be engineered using the design of the chill body and the cooling channels. It should be understood that although several exemplary cooling rates are disclosed herein, the value of the cooling rate for any specific alloy cannot be specified herein as a fixed numerical value, because that value varies depending on the metal compositions, materials, and the shape and thickness of the sheet being formed. However, the value can be determined for each case using conventional heat flow calculations.

Accordingly, for bulk solidifying amorphous alloys, it is possible to reliably continue to process sheets even at low wheel rotational speeds by employing a high viscosity regime, so that the melt does not spill over the wheel, allowing for the formation of sheets with thicknesses up to about 10 mm.

Although specific embodiments are disclosed herein, it is expected that persons skilled in the art can and will design alternative continuous sheet casting apparatuses and methods to produce continuous amorphous alloy sheets that are within the scope of the following claims either literally or under the Doctrine of Equivalents.

What is claimed is:

1. A method for the continuous casting of sheets of an amorphous material comprising:

providing a quantity of a bulk a solidifying amorphous alloy at a temperature above the melting temperature of the bulk solidifying amorphous alloy;

stabilizing the bulk solidifying amorphous alloy at a casting temperature below the melting temperature ($T_m$) of the alloy and above the temperature at which crystallization occurs on the shortest time scale for the alloy ($T_{NOSE}$) such that the bulk solidifying amorphous alloy is in a viscosity regime of about 0.1 to 10,000 poise;

introducing the stabilized bulk solidifying amorphous alloy onto a moving casting body such that a continuous sheet of heated bulk solidifying amorphous alloy is formed thereon; and quenching the heated bulk solidifying amorphous alloy at a quenching rate sufficiently fast such that the bulk solidifying amorphous alloy remains in a substantially amorphous phase to form a solid amorphous continuous sheet having a thickness of at least 0.1 mm.

2. The method of claim 1, wherein the viscosity of the bulk solidifying amorphous alloy at the "melting temperature" Tm of the bulk solidifying amorphous alloy is from about 10 to 100 poise.

3. The method of claim 1, wherein the viscosity of the bulk solidifying amorphous alloy at the "melting temperature" Tm of the bulk solidifying amorphous alloy is from about 1 to 1000 poise.

4. The method of claim 1, wherein the critical cooling rate of the bulk solidifying amorphous alloy is less than 1,000° C./sec.

5. The method of claim 1, wherein the critical cooling rate of the bulk solidifying amorphous alloy is less than 10° C./sec.

6. The method of claim 1, wherein the quenching occurs on the casting body.

7. The method of claim 1, wherein the casting body is selected from the group consisting of a wheel, a belt, double-roll wheels.

8. The method of claim 1, wherein the casting body is formed from a material having a high thermal conductivity.

9. The method of claim 1, wherein the casting body is formed of a material selected from the group consisting of copper, chromium copper, beryllium copper, dispersion hardening alloys, and oxygen-free copper.

10. The method of claim 1, wherein the casting body is at least one of either highly polished or chrome-plated.

11. The method of claim 1, wherein the casting body moves at a rate of 0.5 to 10 cm/sec.

12. The method of claim 1, wherein the casting temperature is stabilized in a viscosity regime of 1 to 1,000 poise.

13. The method of claim 1, wherein the casting temperature is stabilized in a viscosity regime of 10 to 100 poise.

14. The method of claim 1, wherein the solid amorphous alloy sheet has a thickness of 0.1 to 10 mm.

15. The method of claim 1, wherein the solid amorphous alloy sheet has a thickness of 0.5 to 3 mm.

16. The method of claim 1, wherein the heated alloy is introduced onto the casting body under pressure.

17. The method of claim 1, wherein the bulk solidifying amorphous alloy can be described as $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages.

18. The method of claim 17, wherein the bulk solidifying amorphous alloy further comprises up to 20% atomic of at least one additional transition metal selected from the group consisting of Hf, Ta, Mo, Nb, Cr, V, Co.

19. The method of claim 1, wherein the bulk solidifying amorphous alloy ferrous metal based.

20. The method of claim 1 wherein the bulk solidifying amorphous alloy further comprises ductile crystalline phase precipitates.

*21. A method comprising:*

*stabilizing a heated bulk solidifying amorphous alloy at a casting temperature below a melting temperature ($T_m$) of the alloy and above a temperature at which crystallization occurs on the shortest time scale for the alloy ($T_{NOSE}$) such that the bulk solidifying amorphous alloy is in a viscosity regime of about 0.1 to 10,000 poise; and*

*quenching the stabilized bulk solidifying amorphous alloy on a moving casting body sufficiently fast, such that the bulk solidifying amorphous alloy remains in a substantially amorphous phase, to form a solid continuous sheet of bulk solidifying amorphous alloy,*

*wherein the solid continuous sheet has a thickness of at least 0.1 mm.*

*22. The method of claim 21, wherein the viscosity of the bulk solidifying amorphous alloy at the "melting temperature" Tm of the bulk solidifying amorphous alloy is from about 10 to 100 poise.*

*23. The method of claim 21, wherein the viscosity of the bulk solidifying amorphous alloy at the "melting temperature" Tm of the bulk solidifying amorphous alloy is from about 1 to 1000 poise.*

*24. The method of claim 21, wherein the critical cooling rate of the bulk solidifying amorphous alloy is less than 1,000° C./sec.*

*25. The method of claim 21, wherein the casting body is formed from a material having a high thermal conductivity.*

*26. The method of claim 21, wherein the casting body is formed of a material selected from the group consisting of copper, chromium copper, beryllium copper, dispersion hardening alloys, and oxygen-free copper.*

*27. The method of claim 21, wherein the casting body moves at a rate of 0.5 to 10 cm/sec.*

*28. The method of claim 21, wherein the casting temperature is stabilized in a viscosity regime of 1 to 1,000 poise.*

*29. The method of claim 21, wherein the casting temperature is stabilized in a viscosity regime of 10 to 100 poise.*

*30. The method of claim 21, wherein the solid amorphous alloy sheet has a thickness of 0.1 to 10 mm.*

*31. The method of claim 21, wherein the solid amorphous alloy sheet has a thickness of 0.5 to 3 mm.*

*32. The method of claim 21, wherein the heated alloy is introduced onto the casting body under pressure.*

*33. The method of claim 21, wherein the bulk solidifying amorphous alloy can be described as $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages.*

*34. The method of claim 21, wherein the bulk solidifying amorphous alloy ferrous metal based.*

*35. The method of claim 21 wherein the bulk solidifying amorphous alloy further comprises ductile crystalline phase precipitates.*

* * * * *